PULSE AMPLITUDE RESPONSIVE CIRCUIT

Filed April 13, 1955

INVENTORS
JOHN W. WOESTMAN
DONALD E. FELTS
BY
R. I. Tompkins
ATTORNEYS

United States Patent Office 2,892,941

Patented June 30, 1959

2,892,941

PULSE AMPLITUDE RESPONSIVE CIRCUIT

John W. Woestman, Palmyra, and Donald E. Felts, Morristown, N.J., assignors, by mesne assignments, to the United States of America as represented by the Secretary of the Navy Application April 13, 1955, Serial No. 501,213

3 Claims. (Cl. 250—27)

The present invention relates to a pulse amplitude responsive circuit and more particularly to a pulse amplitude responsive circuit utilizing a timing circuit.

It is often desirable to measure the height of a pulse or to have a circuit which is responsive to the voltage amplitude of a pulse. In the illustrative embodiment shown of the present invention the pulse to be measured is fed to the input of an amplifier circuit. This amplifier circuit is connected to the input of a second amplifier circuit by means of a voltage dividing arrangement of capacitors. One of these capacitors controls the bias on the second amplifier and tends to remain in a negative bias condition due to grid current, cutting off the second amplifier in the absence of an input pulse. The input pulse to the first amplifier produces a positive output which charges up the bias capacitor to a positive voltage turning on the second amplifier. The second amplifier remains in a conducting condition until the bias capacitor loses its positive charge from grid current flow and cuts off the second amplifier. The length of time the second amplifier conducts is a function of the time the bias capacitor retains its positive charge which in turn is a function of the maximum positive voltage to which the bias capacitor is charged. It is evident that it is the amplitude of the input voltage pulse that determines the maximum charge voltage of the bias capacitor. Thus, the conduction time of the second amplifier is a function of the input pulse voltage magnitude. A current or voltage energized timer can be placed in the second amplifier circuit and calibrated directly in voltage to give a measure of the input pulse magnitude, or the current or voltage of the second amplifier can be used directly to operate or energize other circuits.

Accordingly, an object of the present invention is the provision of a circuit for converting pulse voltage magnitudes into electrical time signals.

Another object of the present invention is to provide a circuit for measuring pulse voltage magnitudes.

A further object of the present invention is the provision of a circuit for producing electrical signals having time durations which are a function of the voltage magnitudes of input pulses.

Still another object of the present invention is to provide a simple rugged circuit for producing an indication of the voltage amplitudes of input pulses.

Other objects and many of the attendant advantages of this invention will be readily appreciated as the same becomes better understood by reference to the following detailed description when considered in connection with the accompanying drawings wherein.

Figure 1:
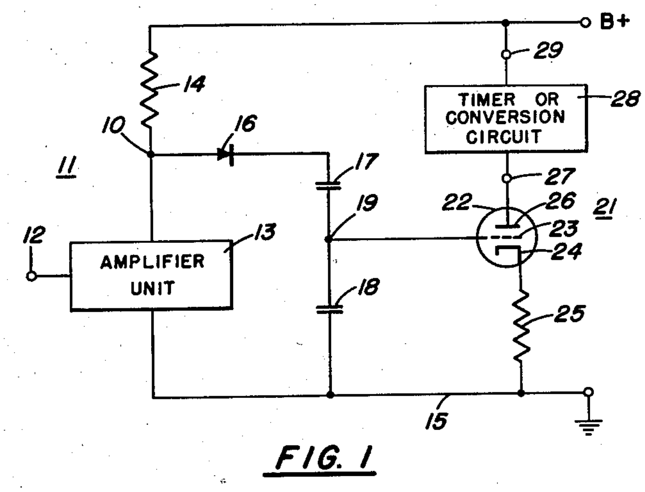
Fig. 1 shows a circuit diagram of a preferred embodiment of the invention.
Figure 2:
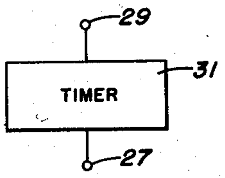
Fig. 2 illustrates a timer that can be used in the circuit of Fig. 1.
Figure 3:
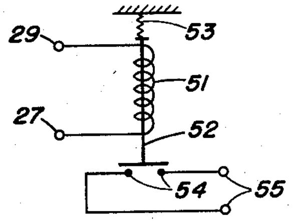
Fig. 3 is a diagrammatic view of a relay circuit that can be utilized in the circuit of Fig. 1.

Referring now to the drawings, wherein like reference characters designate like or corresponding parts throughout the several views, there is shown in Fig. 1 (which illustrates a preferred embodiment) a first amplifying circuit 11 for amplifying an input pulse received at terminal 12 consisting of an amplifier unit 13, such as a vacuum tube or a transistor etc., connected through resistor 14 to a source of positive D.C. voltage, B+. Conducting lead 15 provides a connection to ground for the amplifier unit 13, thus completing the amplifier circuit. Amplifier unit 13 consists of several amplifier stages the number of which is dependent upon the polarity of the incoming pulse and the desired amplification. For any polarity of input pulse the output of 11 should be a positive signal. As is well known, this can be arranged through the choice of the number of stages of an amplifier. Rectifier 16 is connected to terminal 10, the output of amplifier unit 13, and is poled to conduct current to capacitors 17 and 18. The terminal 19 between capacitors 17 and 18 is connected to the grid 23 of vacuum tube 22, here shown to be a triode but which could be of another type. Tube 22 is the amplifier unit for second amplifying circuit 21. As should be apparent, it is not necessary that this circuit be used, e.g. if a high voltage output is desired then probably a pentode circuit would be most useful. Cathode 24 of tube 22 is connected through resistor 25 to lead 15 and thus to ground. Plate 26 is connected to terminal 27 through a timer or conversion circuit 28 and terminal 29 to the B+ voltage supply. Fig. 2 illustrates a simple timer 31 that can be calibrated directly in voltage and inserted between terminals 27 and 29. Fig. 3 is a relay circuit which can be placed between terminals 27 and 29 comprising relay coil 51, armature 52, adjustable tension spring 53 and contacts 54. Terminals 55 are provided for external circuit connections.

In operation, before a pulse is applied to the input at 12, the last stage of amplifier unit 13 is conducting heavily which means that terminal 10 is at a potential less than B+ due to the voltage drop in resistor 14. Capacitors 17 and 18 charge up to the voltage at terminal 10 through rectifier 16, the voltage across them being in an inverse ratio to their capacities. Then, since capacitor 18 is charged positively, much of the bias developed by resistor 25 in the cathode circuit of tube 22 is overcome and electrons are attracted to the grid 23. These electrons neutralize the charge on capacitor 18 and continue to charge 18 in the opposite direction until tube 22 is cut-off. When a pulse is applied to the circuit at 12, the conductivity of the last stage of unit 13 is lowered causing less current through resistor 14 and thus a positive rise in voltage at terminal 10. Capacitors 17 and 18 begin to charge, in series with rectifier 16 and resistor 14, to the new potential at terminal 10. This new potential is a function of the amplitude of the pulse applied at terminal 12, i.e. the higher the pulse voltage the larger the new potential at terminal 10. Hence, the voltage to which capacitor 18 charges is a function of the amplitude of the applied pulse. The resulting positive charge on capacitor 18 permits tube 22 to conduct and pass current through the timer or conversion circuit 28. After the pulse, the discharge of capacitors 17 and 18 is prevented from discharging by rectifier 16 and the timer or conversion circuit 28 remains energized until the accumulation of negative charge on capacitor 18 again drives tube 22 to cut-off. Thus, tube 22 conducts current through circuit 28 only during the time commencing with the reception of a pulse at 12 and terminating with the accumulation of negative charges on capacitor 18 and the resulting cut-off of tube 22. This time is dependent on the maximum voltage to which capacitor 18 is charged and as stated supra it is a function of the height of the applied pulse. Therefore, a current responsive timing circuit 28 can be placed in the plate circuit of tube 22 and it will give a response or indication which is a function of the input pulse amplitude. Timer 31 of Fig. 2, which may be any current responsive timing circuit, can be utilized in the plate circuit of tube 22 and if calibrated directly in voltage will give an indication of the magnitude of the applied pulse. If in some applications it may be desirable to open or close a circuit for a length of time which is a function of the amplitude of a pulse, a relay circuit such as shown in Fig. 3 can be used. The relay coil 51 is connected between terminals 27 and 29 and will be energized by the plate current of tube 22 to open or close contacts 54 depending upon whether the relay is of the normally open or closed type. Other modifications are apparent, e.g. if the input pulses are of a constant frequency, a series connection of a voltage supply can be placed between terminals 55 or Fig. 3 and the reading obtained from the meter will be a function of the height of the input pulses. The disclosed invention is simple in construction and none of the components have critical values. The following components have been found suitable:

| | | |
|---|---|---|
| Amplifier Unit 13 | | ½12AT7 |
| Tube 22 | | ½12AT7 |
| Rectifier 16 | | ½6AL5 |
| Resistor 14 | ohms | 47K |
| Resistor 25 | do | 1K |
| Capacitor 17 | microfarads | .05 |
| Capacitor 18 | do | .015 |
| B+ | volts | 280 |

It is to be understood that these values are merely representative and not limiting. A change in circuit components within limits, which should be evident to one skilled in the art, would still give an operative system, but the timer would require recalibration. A system has been disclosed for producing a circuit signal having a duration time that is a function of input pulse voltage magnitude. This simple rugged system has many and varied applications which will be apparent to one skilled in the pertinent arts.

Obviously many modifications and variations of the present invention are possible in the light of the above teachings. It is therefore to be understood that within the scope of the appended claims the invention may be practiced otherwise than as specifically described.

What is claimed is:

1. A system for producing an electrical signal the time duration of which is a function of the magnitude of an input pulse comprising; a first terminal for receiving an input pulse, two capacitors connected in series, a second terminal connected between said capacitors, amplifier means connected to said first terminal for producing a positive amplified pulse of an input pulse, rectifier means connected to said amplifying means and to said capacitors for conducting said amplified pulse to charge said series connected capacitors, a vacuum tube having a plate circuit and a grid input circuit, connections between said second terminal and said grid input circuit whereby the positive charge on one of said series capacitors places a bias on said vacuum tube allowing said vacuum tube to conduct until the positive charge is diminished by grid current to such an extent that the cutoff point for the tube is reached.

2. The system as set forth in claim 1 having in addition an electrical signal responsive means connected in said plate circuit.

3. A circuit for permitting current to flow in a current responsive means for a period of time proportional to the amplitude of a voltage pulse comprising a first electron discharge tube having a grid, said current responsive means connected to a source of high potential and grounded through said first electron discharge tube, the flow of current in said current responsive means being controlled by the conductive condition of said tube, a second electron discharge tube adapted to have said voltage pulse applied thereto whereby the plate thereof is placed at a potential proportional to the amplitude of said pulse, a pair of serially connected capacitors, rectifying means connected to said plate and through said pair of serially connected capacitors to ground whereby said capacitors are charged to voltages proportional to the potential on said plate, and conductors for connecting said grid of said first electron discharge tube to ground through one of said capacitors thereby controlling the conducting condition of said first electron discharge tube.

References Cited in the file of this patent

UNITED STATES PATENTS

| | | |
|---|---|---|
| 2,237,425 | Geiger et al. | Apr. 8, 1941 |
| 2,287,926 | Zepler | June 30, 1942 |
| 2,350,069 | Schrader et al. | May 30, 1944 |
| 2,414,486 | Rieke | Jan. 21, 1947 |
| 2,447,507 | Kenyon | Aug. 24, 1948 |